United States Patent [19]

Wise

[11] 4,212,846

[45] Jul. 15, 1980

[54] BREATHING APPARATUS CHEMICAL CANISTER WITH DUST SEAL

[75] Inventor: Layton A. Wise, Washington, Pa.

[73] Assignee: Mine Safety Appliances Company, Pittsburgh, Pa.

[21] Appl. No.: 4,660

[22] Filed: Jan. 19, 1979

[51] Int. Cl.2 ............................ B01J 7/00; C10H 7/00

[52] U.S. Cl. .................................... 422/122; 422/126; 422/120; 128/205.28; 128/205.29

[58] Field of Search ............... 128/142 R, 191 R, 188, 128/142.6, 146.6, 147, 212; 55/387, 316, DIG. 35, DIG. 33, 517; 422/120, 164, 305, 122, 126

[56] References Cited

U.S. PATENT DOCUMENTS

| | | | |
|---|---|---|---|
| 1,789,194 | 1/1931 | Rockwell | 55/DIG. 33 |
| 2,115,946 | 5/1938 | Eaton | 55/387 |
| 2,758,015 | 8/1956 | Bovard et al. | 422/120 X |
| 3,966,440 | 6/1976 | Roberts | 55/DIG. 33 X |

*Primary Examiner*—Henry J. Recla
*Attorney, Agent, or Firm*—Brown, Flick & Peckham

[57] ABSTRACT

A breathing apparatus chemical canister includes a central vertical tube, around which there is a body of chemical granules covered by an upper sheet of filtering material provided with inner and outer downwardly extending flanges engaging the tube and the side of the canister. Disposed between the chemical body and filter sheet is an upper screen having inner and outer downwardly extending flanges pressing the filter sheet flanges against the tube and side of the canister to form seals. A similar lower sheet of filtering material and lower screen around the lower end of the tube support the chemical body and the flanges of the lower screen press the filter sheet flanges against the tube and side of the canister to form seals.

2 Claims, 3 Drawing Figures

BREATHING APPARATUS CHEMICAL CANISTER WITH DUST SEAL

In a breathing apparatus chemical canister containing granules of a chemical, such as $KO_2$, for example, dust is formed by the granules rubbing against one another when the canister is moved about. It is highly desirable to prevent this dust from entering the inhalation tube while the canister is in use. Accordingly, it is an object of this invention to provide seals in the canister that will maintain the chemical dust therein and that will not prevent the full cross sectional area of the canister from being utilized for air flow.

Figure 1:
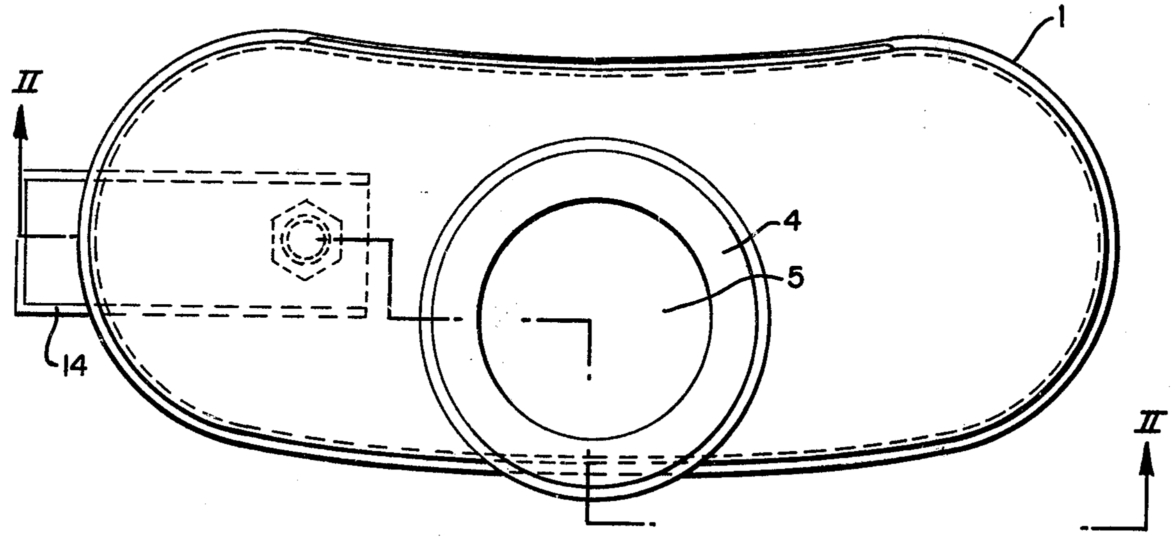
Figure 3:
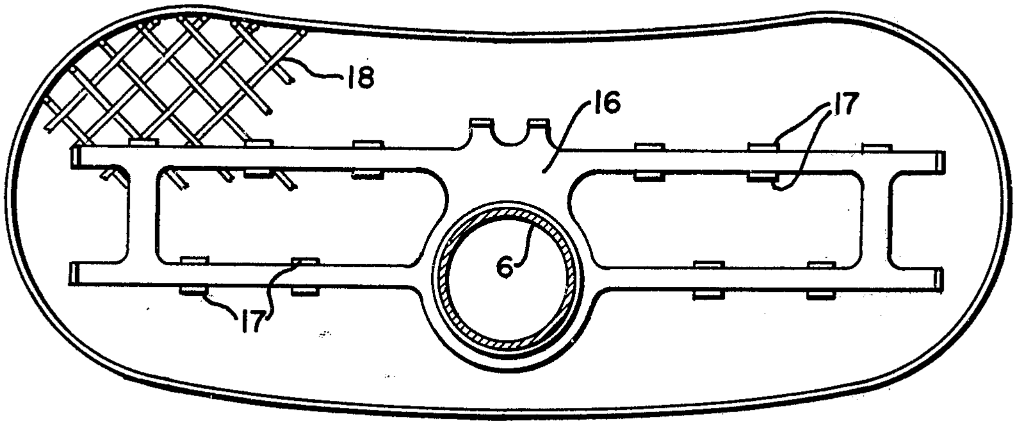
Figure 2:
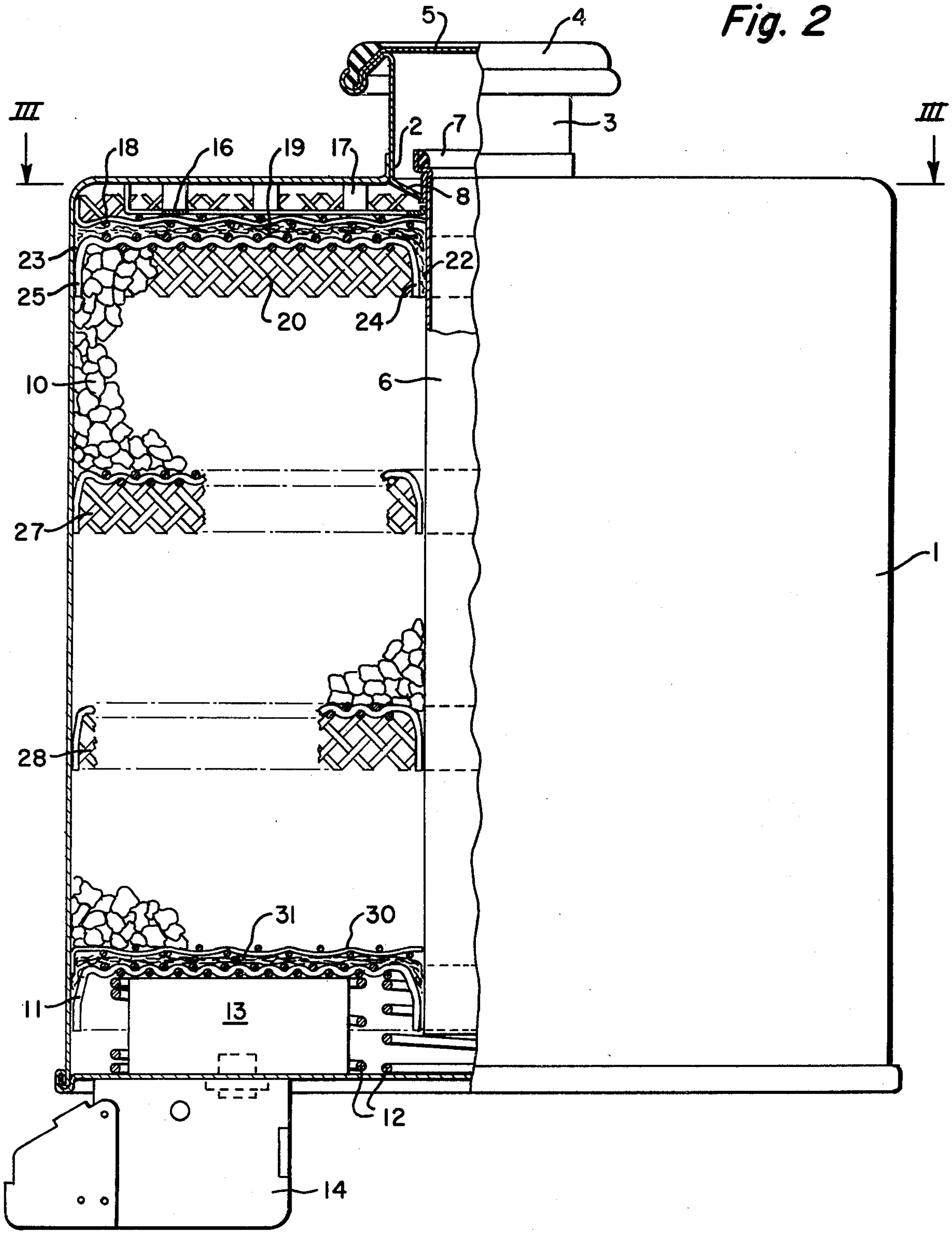

The preferred embodiment of the invention is illustrated in the accompanying drawings, in which FIG. 1 is a plan view of a chemical canister;

FIG. 2 is a side view and vertical section taken on the line II—II of FIG. 1; and FIG. 3 is a horizontal section taken on the line III—III of FIG. 2.

Referring to FIG. 2 of the drawings, a typical breathing apparatus chemical canister is formed from a metal can 1 having a central opening 2 in its top, from which a neck 3 extends upwardly. The upper end of the neck is encircled by a sealing ring 4 that holds a copper foil disk 5 in place to form a seal. Extending downwardly in the can from the neck to a point near the bottom of the can is a vertical tube 6, down through which exhaled air flows while the canister is in use. The upper end of this tube inside the lower part of the neck is enlarged and provides an annular recess containing a sealing ring 7. The tube is supported by a spider 8 in the space between the tube and the surrounding part of the top of the can.

The space between the vertical tube and the side of the can is filled with a body of chemical granules 10, except that this body is spaced a short distance from the top and bottom of the can in a manner that will be explained. The chemical body is supported by a lower screen 11 provided with a central opening that receives the lower end portion of the tube. This screen, in turn, is supported by coil springs 12 and a candle 13 that can be ignited by a firing mechanism 14 extending downwardly from the bottom of the can.

The top of the chemical body is spaced from the top of the can in part by a metal strip 16 (FIGS. 2 and 3) having a central opening through which the tube extends. The edges of the strip are provided with upwardly projecting tabs 17 that space the rest of the strip from the top of the can. Engaging the bottom of this strip is a wire screen 18 that rests on a sheet of filtering material 19, such as a glass fiber mat, that is provided with an opening receiving the vertical tube. This filter sheet, in turn, rests on another wire screen 20 that engages the top of the chemical body.

In accordance with this invention, screen 20 is the means by which the filter sheet is sealed against tube 6 and the side of the can. Accordingly, the filter sheet 19 is provided with an inner downwardly extending flange 22 encircling the tube and engaging it, and with an outer downwardly extending flange 23 engaging the side of the can. The screen 20 below it likewise has inner and outer downwardly extending flanges 24 and 25, respectively, and they press the filter sheet flanges against the tube and the side of the can to form seals in those two locations that will prevent chemical dust from entering the space above the filter sheet.

In assembling the canister, it is turned bottom side up before its bottom wall is applied, and the spacing strip 16 is slid down the vertical tube to its position at the opposite end of the tube. Then screen 18 is placed on top of the spacing strip. Flanged screen 20 then is placed on the filter sheet, which is larger than the cross sectional area of the can, and this assembly is pushed down into the can around the tube. This causes the area of the filter sheet around its central opening to be forced up between the tube and the inner flange 24 to form flange 22 of the screen. At the same time, the outer marginal area of the filter sheet that overlapped the side of the can is forced up between the can and the outer flange 25 of the screen to form filter flange 23. The filter sheet and the screen are moved in this relation down the tube until the filter engages screen 18. The inner and outer flanges of the filter sheet are compressed between the screen flanges and the tube and the side of the can to form the seals in those areas. Preferably, in order to facilitate the assembly and to assure pressure of the screen flanges against the filter flanges, the inner flange of the screen converges toward its free edge and the outer flange of the screen diverges in the same direction. This produces a wedging effect on the filter flanges as the filter flanges force the two screen flanges toward each other slightly.

Following the insertion of the filter sheet and screens just mentioned, the chemical granules are poured into the canister. At suitable intervals, screens 27 and 28 similar to screen 20 may be inserted if desired to separate the chemical body into smaller sections.

After the required amount of chemical granules has been poured into the can up to a level spaced from the end of the tube, a screen 30 with a central opening for the tube is inserted into engagement with the chemical body. Then another filter sheet 31 and screen 11, which is like those first described, may be inserted, with screen 11 pressing the adjoining flanges of filter sheet 31 against the tube and the side of the can to form seals. The next step is to place the coil springs on top of the last screen and then apply the bottom wall of the can, with the candle attached to it, by crimping the edge of the bottom wall to the exposed edge of the can to seal the can.

The sealing engagement of the filter sheets with the central tube and the side of the can prevents any dust from escaping from the chemical body into the breathing circuit. These seals are formed while allowing the full cross sectional area of the canister to be utilized for air flow, thereby holding air flow resistance to a minimum.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A breathing apparatus chemical canister comprising a can having a neck extending upwardly from its top, a tube extending downwardly in the can from the neck to a point near the bottom of the can, a body of chemical granules in the can spaced from its top and bottom, an upper sheet of filtering material covering the top of said body and provided with an opening receiving said tube, said sheet being provided with an inner downwardly extending flange engaging said tube and with an outer downwardly extending flange engaging the side of the can, an upper screen disposed between said chemical body and filter sheet in engagement with both and having inner and outer downwardly extending flanges pressing said filter sheet flanges against said tube and side of the can to form seals, a lower sheet of filtering material like said upper sheet around the lower end of said tube beneath the chemical body, and a lower screen like said upper screen supporting the lower sheet, the inner and outer flanges of the lower screen pressing the flanges of the lower filter sheet against the tube and side of the can to form seals.

2. A breathing apparatus chemical canister according to claim 1, in which said inner flanges of the screens converge downwardly and said outer flanges of the screens diverge downwardly.

* * * * *